May 21, 1968 — C. F. MILLER — 3,384,287

JET CONVEYING SYSTEM

Filed Dec. 13, 1965 — 2 Sheets-Sheet 1

Inventor:
CHARLES FREDRICK MILLER
By Bair, Freeman & Molinare, Attys.

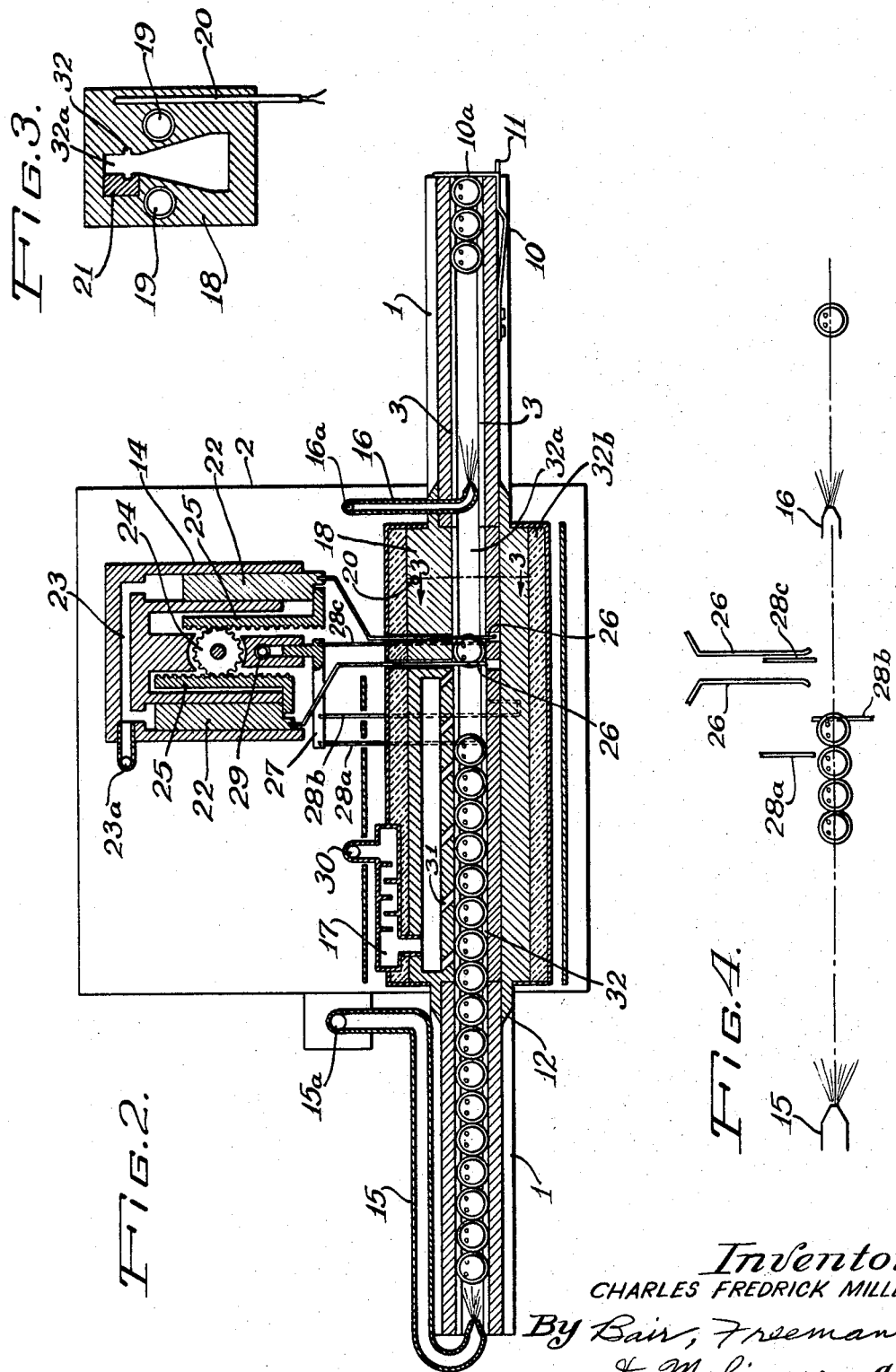

United States Patent Office 3,384,287
Patented May 21, 1968

3,384,287
JET CONVEYING SYSTEM
Charles Fredrick Miller, Anaheim, Calif., assignor to Basic Products Corporation, a corporation of Wisconsin
Filed Dec. 13, 1965, Ser. No. 513,207
5 Claims. (Cl. 228—49)

ABSTRACT OF THE DISCLOSURE

A conveying apparatus for moving semi-conductor components during component fabrication. Carriers having internal channels in which the components are inserted are attached to a work station while pressurized air drives the components along the channel and an escapement mechanism insures that the components are delivered one at a time to the work station. Heaters are provided in the carrier and work station to maintain operating temperatures during fabrication.

This invention relates to an apparatus and method for handling parts and conveying them through an in-line furnace and work station assembly by action of jets of gas. In particular, the invention relates to a device for handling partially assembled semi-conductor headers for transport through an in-line furnace for heating and subsequently positioning for bonding operations at a work location. The apparatus and method of this invention may be used in conjunction with the universal bonding machine described in my co-pending applications Ser. No. 533,998 filed Mar. 14, 1966, and Ser. No. 534,245 filed Mar. 14, 1966, for performing die and wire bonding operations in the manufacture of semi-conductor devices.

Heretofore, partially assembled semi-conductor parts, such as headers, have been transported individually from racks or trays to single heating stations where they are conditioned by heating one at a time for bonding operations. Other systems which group parts for batch handling have been built around some type of multi-part carrier such as a rotary disc with peripheral cavities or an in-line system with one or more flat strips which confine the parts in cavities. In such systems, the carrier usually undergoes conditioning, such as heating in accordance with a time temperature program, along with the semi-conductor parts being conveyed.

Prior art carrier systems all require a prohibitive amount of manual handling of parts, which is awkward and time-consuming. The system of my invention overcomes the disadvantages of the prior art by providing a carrier and work station assembly in which the semi-conductor parts are loaded and maintained in random orientation in a carrier device which may be loaded and unloaded with a minimum of effort.

It is thus an object of this invention to provide a semi-conductor handling system wherein the individual parts are loaded and conveyed through the system with minimum effort and time consumption.

It is another object of this invention to provide a semi-conductor handling system wherein the individual parts are loaded at random in a carrier assembly and conveyed through the system by jets of pressurized gas.

It is a further object of this invention to provide a semi-conductor handling system wherein individual parts are conveyed through the system by jets of pressurized gas and the parts are manipulated at the work station by novel means hereinafter described.

Other objects of the invention will become apparent as it is further described.

In the drawings:

FIG. 2 is a plan view of the assembly of FIG. 1 showing the control means for moving the semi-conductor pieces;

FIG. 3 is a view along line 3—3 of FIG. 2;

FIG. 4 is a schematic diagram showing part of the control means of the assembly;

Figure 1:
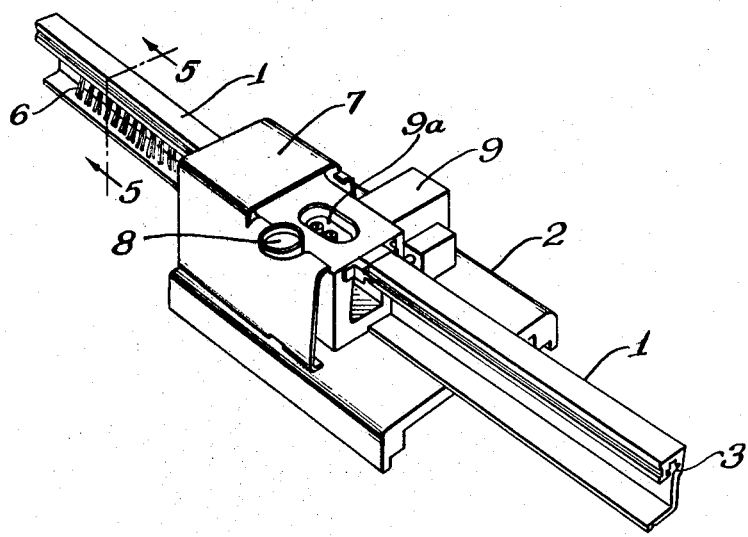
FIG. 1 is a perspective view of the complete assembly including workpiece carriers, a furnace and a work station.
Figure 5:
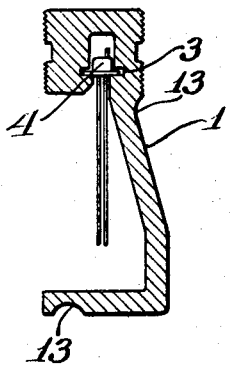
FIG. 5 is a view along line 5—5 of FIG. 1.
Figure 6:
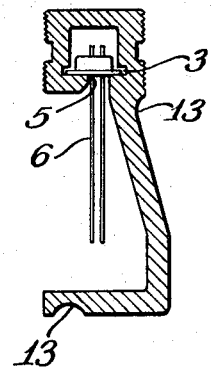
FIG. 6 is a view similar to FIG. 5 showing another embodiment of the workpiece carrier.

Referring to FIG. 1, the device of the invention comprises essentially workpiece carriers 1 which are removably attached to a work station assembly shown generally at 2. Each carrier is grooved as shown at 3 (FIGS. 5 and 6) to accommodate a family of semi-conductor headers having pin-type leads disposed in a direction at right angles to the mounting plane of the header, such as headers designated in the trade as TO18 and TO5. Grooves 3 engage the circular flange projection of the headers and support the headers as they move through the system. The groove cross-section may be of any desired configuration. For example, the carrier shown in FIGS. 1 and 5 is designed to accommodate the TO18 header as shown at 4 in FIG. 5. The alternative embodiment shown in FIG. 6 is designed to accept the standard TO5 three-pin header. The face 5 of groove 3 shown in FIG. 6 is positioned to orient the header in rotation by sensing the arrangement of leads 6 as shown in FIG. 6.

Work station assembly 2 comprises a furnace shown generally at 7, a dice cup 8 into which are placed semi-conductor dies which are to be bonded to the workpieces, and a housing for the workpiece actuating mechanism shown generally at 9. The housing is open at 9a to permit the headers to be contacted by a bonding tool (not shown) from above.

Partially assembled semi-conductor pieces are loaded into one of the carriers by insertion from either end with the carrier disconnected from work station 2. The workpieces may be quickly loaded into the carriers wherein they are randomly arranged in line with leads 6 projecting downwardly in the carrier as shown in FIG. 1. Grooves 3 are partially closed at each end of the carriers by a flat spring 10 having an end portion 10a as shown in FIG. 2. Spring 10 has a projecting tip 11 for manual gripping to withdraw the end of the spring from grooves 3 and permit entry or exit of workpieces from the carrier. When carriers 1 are attached to work station 2 as shown in FIGS. 1 and 2, spring 10 is held open by a ramp cam 12 provided at each point of attachment of carrier 1 to work station 2. By means of cam 12, groove 3 is opened and the flanges of the headers are allowed to pass from the carrier to the work station which has mating grooves 32 to accommodate the headers. Longitudinal circular recesses 13 are provided on carriers 1 to accept tubular members (not shown) which form a support for the carriers during their attachment to work station 2.

Referring to FIG. 2, work station 2 comprises an actuating and control section shown generally at 14 whereby the individual headers are positioned and controlled for and during the bonding operation; gas jet lines 15 and 16 which direct gas through ports 15a and 16a from a source (not shown) for propelling the headers through the carriers 1 and work station 2; and a gas heating chamber 17 wherein inert gas is supplied through port 30 and heated for blanketing the headers and work station during the bonding operation. Diagonal slots 31 direct the inert gas to force the headers to the right in FIG. 2, hereinafter more fully explained.

Referring to FIGS. 2 and 3, work station 2 is provided with an elongated block 18 having a channel 32a with grooves 32 adapted to mate with carrier grooves 3.

Block 18 is insulated by any conventional insulation material 32b and has two longitudinal passages 19 for accommodating heating elements. Thermocouple 20 is maintained in block 18 to measure the temperature of the block. Block 18 is further provided with a removable insert piece 21 which adapts block 18 to mate with carriers of different cross-section. As shown in FIG. 3 insert piece 21 adapts block 18 to mate with the carrier shown in FIG. 5.

The control section shown generally at 14 comprises a pair of slidable pistons 22 which are urged downward as shown in FIG. 2 by gas pressure in passage 23 provided through port 23a. Alternatively, pistons 22 are urged upwardly by applying vacuum to port 23a. Pistons 22 are operated reciprocably by rotation of pinion 24 which moves bars 25 in opposite directions. Pistons 22 are in contact with bars 25 when the pistons are being urged downwardly under pressure and thus pistons 22 move in response to rotation of pinion 24. When vacuum is maintained in port 23, pistons 22 are retracted independently of arms 25 and pinion 24 as hereinafter explained.

Attached to the ends of each piston 22 are control fingers 26 preferably metal tubing or thin metal strips which reciprocate along with pistons 22. Control fingers 26 contact the semi-conductor header which is at the bonding position and are capable of rotating the header in response to rotation of pinion 24.

Control section 14 is further provided with a movable bar 27 to which is attached three fingers 28a, 28b and 28c. All three fingers 28 move in response to actuation of bar 27 which is controlled in response to gas pressure through gas port 29. When gas is supplied through port 29, bar 27 moves downwardly as shown in FIG. 2 and all three fingers 28 are projected downwardly. When vacuum is supplied through port 29, bar 27 moves upwardly as shown in FIG. 2 and all three fingers 28 are retracted. As shown in FIGS. 2 and 4, fingers 28a and 28c project across channel 32a when bar 27 is in the extended position and finger 28b is outside the channel. In the retracted position of bar 27, finger 28b blocks the channel and fingers 28a and 28c do not.

The operation of the device will now be described with reference to FIGS. 2 and 4. Partially-assembled semi-conductor headers are first loaded into a carrier 1 which at the time of loading is disconnected from the block 18 as above described. The loaded carrier is then attached to the left side of block 18 as shown in FIG. 2 and the grooves of carrier 1 mate with channel 32a and grooves 32 of block 18 so that there is formed a continuous channel through which the partially assembled headers may pass. During operation of the apparatus, heat input to the heaters located in recesses 19 is varied along the axis of block 18 to account for varying heat losses and to establish a profile of temperature along the length of the furnace so that the headers are brought to a condition of temperature equilibrium with the sensing thermocouple 20. The heaters are preferably electrical resistance heaters. During operation, inert gas is provided in the area of the headers through port 30, chamber 17 and slots 31 as hereinbefore described.

When it is desired to move headers to the work station between fingers 26, a burst of gas is delivered through port 30 to emit through slots 31 to act as jets to convey the headers to the right in block 18. At the same time, a burst of gas is emitted through jet 15 to move headers through carrier 1 into block 18. The progression of headers through block 18 to the work station is controlled by the action of finger gates 28a, 28b and 28c. As shown in FIG. 2, a header is in work position between fingers 26 which may be moved relative to one another by rotation of pinion 24, hereinabove described, to rotate the header for positioning under a bonding needle. Fingers 28a and 28c project into channel 32a and prohibit movement of headers to the right. Finger 28b does not obstruct channel 32a.

After bonding has been completed on the header shown between fingers 26, fingers 26 are retracted by withdrawing pistons 22 as above described and bar 27 is retracted as above described. Thus the header in bonding position is freed and finger 28b is placed in blocking position in channel 32a. A momentary jet of gas as noted above is then admitted to move the column of headers the distance from gate 28a to gate 28b and to discharge the completed header from the work station into the waiting downstream carrier 1 as best shown in FIG. 4. Fingers 28a and 28c are then returned to their position as shown in FIG. 2 to block further movement of headers downstream. A jet of gas is then emitted through ports 31 which causes the new header between fingers 28a and 28c to move into the work ready to be gripped by fingers 26 which are then projected into channel 32a. The new header is bonded as before and the process repeated until bonding all the headers in carrier 1 is completed.

Having described my invention, it should be clear to those skilled in the art that certain modifications may be made thereto within the spirit of the invention which I desired to be limited solely by the appended claims.

I claim:
1. Apparatus for conveying partially assembled semi-conductor work pieces to a work station for die or wire bonding comprising carrier means having an elongated channel adapted to accommodate and support a plurality of said pieces, a work station assembly to which said work pieces are conveyed and positioned for die or wire bonding having a bonding station and an elongated channel adapted to communicate with the channel of said carrier, means for directing a stream of pressurized gas into said carrier to urge said pieces into said work station assembly, means for directing a stream of pressurized gas into said work station assembly to urge said pieces through said assembly, control means in said work station assembly including a plurality of retractable fingers adapted to selectively open and close said elongated channel in said work station assembly to the passage of work pieces therethrough, and means for selectively rotating said pieces at said bonding station to a bonding position.

2. Apparatus of claim 1 wherein said work station assembly includes heaters for maintaining predetermined temperatures within said assembly.

3. Apparatus of claim 1 wherein said means for directing gas into said work station assembly includes a heated chamber for preheating said gas prior to contacting with said assembly.

4. Apparatus of claim 1 wherein said work pieces have a flange portion and said elongated channel has longitudinal grooves therein adapted to slidably receive said flange portion to thereby guide said work pieces through said apparatus.

5. Apparatus of claim 1 including retractable means at each end of said carrier for blocking said channel to prevent movement of said pieces out of said carrier.

References Cited

UNITED STATES PATENTS 2,778,691   1/1957   Hazel _____ 302—21

RICHARD H. EANES, Jr., *Primary Examiner.*